US012754025B2

(12) United States Patent
Averbuch

(10) Patent No.: US 12,754,025 B2
(45) Date of Patent: Oct. 6, 2026

(54) METHOD AND APPARATUS FOR ELECTRIC VEHICLE ROUTING AND ENERGY CONSUMPTION THEREOF

(71) Applicant: HERE GLOBAL B.V., Eindhoven (NL)

(72) Inventor: Alex Averbuch, Buffalo Grove, IL (US)

(73) Assignee: HERE GLOBAL B.V., Eindhoven (NL)

( * ) Notice: Subject to any disclaimer, the term of this patent is extended or adjusted under 35 U.S.C. 154(b) by 186 days.

(21) Appl. No.: 18/389,231

(22) Filed: Nov. 14, 2023

(65) Prior Publication Data

US 2025/0155250 A1 May 15, 2025

(51) Int. Cl.
*G01C 21/34* (2006.01)
*G01C 21/36* (2006.01)
*G07C 5/08* (2006.01)

(52) U.S. Cl.
CPC ..... *G01C 21/3469* (2013.01); *G01C 21/3667* (2013.01); *G07C 5/0816* (2013.01)

(58) Field of Classification Search
CPC ............ G01C 21/3469; G01C 21/3667; G01C 21/3682; G01C 21/3697; G07C 5/0816; B60L 58/14; B60L 2240/622; B60L 2240/642; B60L 2250/16; B60L 2260/52; B60L 2260/54
See application file for complete search history.

(56) References Cited

U.S. PATENT DOCUMENTS

| | | | |
|---|---|---|---|
| 8,543,328 | B2 | 9/2013 | Stille |
| 8,755,993 | B2 | 6/2014 | Calkins et al. |
| 11,592,306 | B2 | 2/2023 | Liu |

(Continued)

FOREIGN PATENT DOCUMENTS

| | | | | |
|---|---|---|---|---|
| DE | 102022118589 | * | 2/2023 | ............. B60L 58/26 |

OTHER PUBLICATIONS

Sarrafan et al., "An Intelligent Driver Alerting System for Real-Time Range Indicator Embedded in Electric Vehicles", IEEE Transactions on Industry Applications, May/Jun. 2017, vol. 53, Issue No. 3, pp. 1751-1760.

(Continued)

*Primary Examiner* — Brodie J Follman
(74) *Attorney, Agent, or Firm* — Adil M. Musabji

(57) ABSTRACT

An approach is provided for an electric vehicle navigation system. For example, a destination is received as input. A geographic database is accessed to obtain data that represents a first road segment of a route to the destination. The data of the first road segment includes a first elevation coefficient of energy consumption associated with a first elevation change. The geographic database is accessed to obtain data that represents a second road segment of the route. The data of the second road segment includes a second elevation coefficient of energy consumption associated with a second elevation change. The first elevation coefficient is different than the second elevation coefficient. Energy consumption by the vehicle along the route is calculated based on the first elevation coefficient and the second elevation coefficient. Data representing energy consumption for the route is outputted as a function of the calculated energy consumption.

17 Claims, 11 Drawing Sheets

(56) References Cited

U.S. PATENT DOCUMENTS

| | | | | |
|---|---|---|---|---|
| 2002/0095247 | A1* | 7/2002 | Ding | B60L 58/34 |
| 2012/0179362 | A1* | 7/2012 | Stille | G01C 21/3469 |
| 2012/0232783 | A1* | 9/2012 | Calkins | G01C 21/3469 |
| 2016/0363456 | A1* | 12/2016 | Pujos | G01C 21/3469 |
| 2017/0307391 | A1 | 10/2017 | Mason et al. | |
| 2021/0389145 | A1* | 12/2021 | Liu | G01C 21/3469 |
| 2022/0355697 | A1* | 11/2022 | Wiebenga | H01M 10/48 |

OTHER PUBLICATIONS

Tannahill et al., "Driver Alerting System Using Range Estimation of Electric Vehicles in Real Time Under Dynamically Varying Environmental Conditions", The Institution of Engineering and Technology Electrical Systems in Transportation, 2016, vol. 6, Issue No. 2, pp. 107-116.

"EV routing", HERE Routing API v8—Developer Guide, Retrieved on Jun. 14, 2023, Webpage available at : https://www.here.com/docs/bundle/routing-api-developer-guide-v8/page/topics/use-cases/ev-routing.html.

"Can Tesla & Other EVs Charge Themselves When Going Downhill? ", Green Car Future, Retrieved on Nov. 3, 2023, Webpage available at : https://www.greencarfuture.com/electric/charge-downhill.

"Downhill Charging, Overcharging?", My Nissan Leaf, Retrieved on Nov. 3, 2023, Webpage available at : https://www.mynissanleaf.com/viewtopic.php?t=34132.

* cited by examiner

METHOD AND APPARATUS FOR ELECTRIC VEHICLE ROUTING AND ENERGY CONSUMPTION THEREOF

BACKGROUND

There is an increasing number of electric vehicles. As with any vehicle, electric vehicles also benefit from navigation services and applications. For example, routing to various destinations and providing guidance are features that a driver or passenger would appreciate and may now even be considered essential by the industry, market, or vehicle consumers. The considerations of battery charge level and drivable distance for electrical vehicles add another level of routing and navigation complexity. Accordingly, there are significant technical challenges to assist consumers of electric vehicles with more accurate navigation in terms of drivable distances over various routes.

SOME EXAMPLE EMBODIMENTS

Therefore, there is a need for an approach for providing more accurate navigation and guidance considering discharge of electric vehicle batteries as well as recharging based on specific uphill and downhill terrain over different routes.

According to one embodiment, a method for an electric vehicle navigation system is provided. A destination is received as input. A geographic database is accessed to obtain data that represents a first road segment of a route to the destination. The data of the first road segment includes a first elevation coefficient of energy consumption associated with a first elevation change. The route includes a plurality of road segments representing a continuous path to the destination on which a vehicle with a battery drive source operates. The geographic database is accessed to obtain data that represents a second road segment of the route. The data of the second road segment includes a second elevation coefficient of energy consumption associated with a second elevation change. The first elevation coefficient is different than the second elevation coefficient. Energy consumption by the vehicle along the route or portion thereof is calculated based on, at least in part, the first elevation coefficient and the second elevation coefficient. Data representing energy consumption for the route or portion thereof is outputted as a function of the calculated energy consumption.

According to another embodiment, an apparatus comprises at least one processor, and at least one memory including computer program code for one or more computer programs, the at least one memory and the computer program code configured to, with the at least one processor, cause the apparatus to receive respective elevation coefficients of energy. The apparatus is also caused to associate a first elevation coefficient of the respective elevation coefficients with a first road segment record and associate a second elevation coefficient of the respective elevation coefficients with a second road segment record. The first elevation coefficient is different than a second elevation coefficient. The apparatus is further caused to store the first road segment record and the second road segment record in a navigation database. The first elevation coefficient is associated with a first elevation change and the second elevation coefficient is associated with a second elevation change, and the navigation database is configured such that the first and second road segments are processed to output a vehicle route to a destination or route information thereof as a function of the first and second elevation coefficients.

According to another embodiment, a computer-readable storage medium carries one or more sequences of one or more instructions which, when executed by one or more processors, cause, at least in part, an apparatus to receive a destination as input. The apparatus is further caused to determine a route from an origin to the destination via a plurality of road segments. The determining includes selecting a first road segment to be part of the route based on a first elevation coefficient of energy associated with a first elevation change, and the first elevation coefficient of energy is attributed to the first road segment in a map database. The apparatus is further caused to output the determined route or a portion thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based on at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Embodiments described herein include a computer program product having computer-executable program code portions stored therein, the computer-executable program code portions including program code instructions configured to perform any method disclosed herein. Also, a product by process can be provided based on the description of user interfaces and methods described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Electric vehicle batteries are discharged faster when the electrical vehicle is driving uphill and partially recharged when it is driving downhill and this may make the estimation of the distance drivable until the next charging erroneous in hilly terrains. Examples of a method, apparatus, and computer program for providing electric vehicle navigation (including, but not limited to, energy information, routing and user interface features) and for providing better and more accurate estimations of drivable distances are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
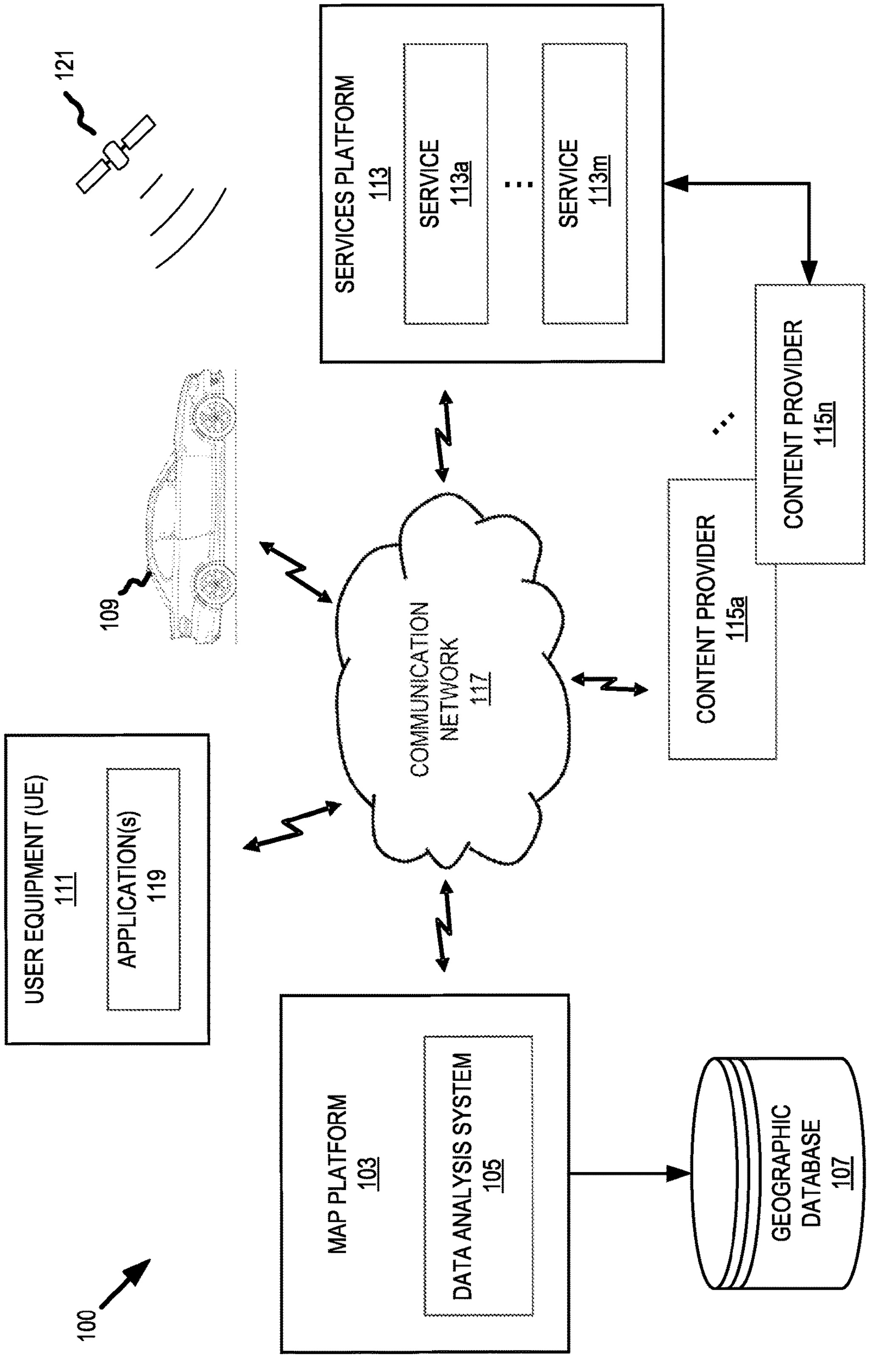
FIG. 1 is a diagram of a system capable of providing electric vehicle navigation, according to one embodiment.

FIG. 1 is a diagram of a system 100 capable of providing electric vehicle navigation, according to one embodiment. In one embodiment, the system 100 captures elevation energy consumption and/or recharge data, like for uphills (inclines) and downhills (declines), and maps it to the different terrain slopes throughout a geographic area. This data is configured in such a way that navigation routing algorithms can utilize it to better estimate battery levels throughout specific routes and drivable distances thereof. Because of the sheer amount of elevation changes along numerous varieties of possible routes, user device manufacturers, service providers, operators, etc. face significant technical challenges to assist users in electric vehicle navigation. This system addresses these problems by having this unique mapping.

In FIG. 1, the system 100 comprises a user equipment (UE) 111. In one embodiment, the UE 111 can provide electric vehicle navigation based on mapped elevation energy data using application(s) 119 according to the embodiments described herein. The system 100 further includes a map platform 103 coupled to a geographic database 107, wherein the map platform 103 performs the functions associated with electric vehicle navigation based on elevation energy data as discussed with respect to the various embodiments described herein. In one embodiment, the UE 111, the map platform 103, and other components of the system 100 have connectivity to each other via a communication network 117.

In one embodiment, one or more vehicles 109 is an electric vehicle. An electric vehicle may be a vehicle that utilizes a battery as the drive source, meaning the battery is the energy source that allows or propels the vehicle to drive along roads. The vehicle 109 may also be a hybrid vehicle, which utilizes both a battery for the drive source as well as other fuels such as gasoline. The vehicle 109 can be a car, truck, or bi-wheel (like a road cycle) or tri-wheel vehicle that operates on a road network. The vehicle 109 can be an autonomous vehicle, semi-autonomous vehicle, or a land drone.

In one embodiment, the vehicle 109 is configured to travel using one or more modes of operation for providing electric vehicle navigation based on elevation energy data. The vehicle 109 may include any number of sensors including cameras, recording devices, communication devices, etc. By way example, the sensors may include, but are not limited to, a global positioning system (GPS) sensor for gathering location data based on signals from a positioning satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. Other sensors may be provided that capture and record slope, gradient, elevation, and/or other related data of roads on which the vehicle 109 is traveling. The vehicle 109 may also include recording devices for recording, storing, and/or streaming sensor and/or other telemetry data to the UE 111 and/or the map platform 103.

By way of example, the UE 111 is any type of mobile terminal, fixed terminal, dedicated vehicle control unit, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 111 can support any type of interface to the user (such as "wearable" circuitry, etc.). In one embodiment, the UE 111 may support any type of interface for routing the user and/or the vehicle 109. In addition, a UE 111 may facilitate various input means for receiving and generating information, including, but not restricted to, a touch screen capability, a keyboard and keypad data entry, a voice-based input mechanism, and the like. Any known and future implementations of a UE 111 may also be applicable.

By way of example, the UE 111 may execute the application(s) 119 which may be a location-based service application, a navigation application, a content provisioning application, a camera/imaging application, a media player application, an e-commerce application, a social networking application, and/or the like. In one embodiment, the applications may include one or more feature recognition applications used for identifying or mapping features or routes according to the embodiments described herein. In one embodiment, the application 119 may act as a client for the map platform 103 and perform one or more functions of the map platform 103. In one embodiment, the application 119 may be considered as a Graphical User Interface (GUI) that can provide electric vehicle navigation based on elevation energy data, according to the embodiments described herein.

In one embodiment, the communication network 117 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G or 6G networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the map platform 103 can interact with a services platform 113 and/or one or more content providers 115*a-n* to receive data for providing electric vehicle navigation based on elevation energy data. By way of example, the services platform 113 may include one or more services 113*a-m* for providing content, provisioning services, application services, storage services, mapping services, navigation services, contextual information determination services, location-based services, information-based services (e.g., weather), etc. By way of example, the services 113*a-m* may provide or store traffic data such as road traffic as well as schedule data (e.g., train/subway schedules, elevator schedules, etc.), weather data, and/or other data used by the embodiments describe herein. In one embodiment, the services platform 113 may interact with the UE 111, the vehicle 109, and/or the map platform 103 to supplement or aid in providing electric vehicle navigation based on elevation energy data. In another embodiment, content can be provided via the content provider 115 without the assistance of the service platform 113. Different arrangements between cloud services, such as vehicle original equipment manufacturer (OEM) clouds, may be provided.

By way of example, the UE 111, the vehicle 109, the map platform 103, the services platform 113, and the content provider 115 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
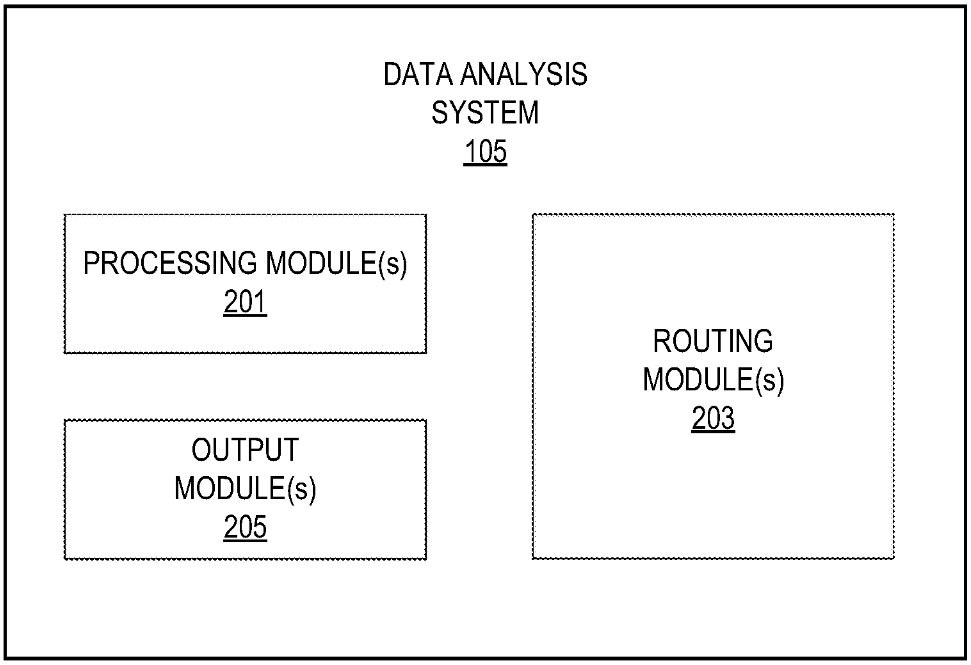
FIG. 2 is a diagram of components of a data analysis system, according to one embodiment.

In one embodiment, the map platform 103 includes a data analysis system 105. The data analysis system 105 may include one or more components for providing electric vehicle navigation based on elevation energy data, according to the various embodiments described herein. As shown in FIG. 2, the data analysis system 105 includes a data processing module 201, a routing module 203, and an output module 205. More, fewer, or different modules may be provided. The above presented modules and components of the data analysis system 105 can be implemented in hardware, firmware, software, or a combination thereof. For example, a module can be one or more processors. It is contemplated that the functions of these components may be combined or performed by other components of equivalent functionality. Though depicted as an entity of the map platform 103 in FIG. 1, it is contemplated that the data analysis system 105 may be implemented as a module of any of the components of the system 100 (e.g., a component of the UE 111, the vehicle 109, etc.). In another embodiment, the data analysis system 105 and/or one or more of the modules 201-205 may be implemented as a cloud-based service, local service, native application, or combination thereof. The functions of these modules are discussed with respect to FIGS. 3, 6, and 8 below.

Figure 3:
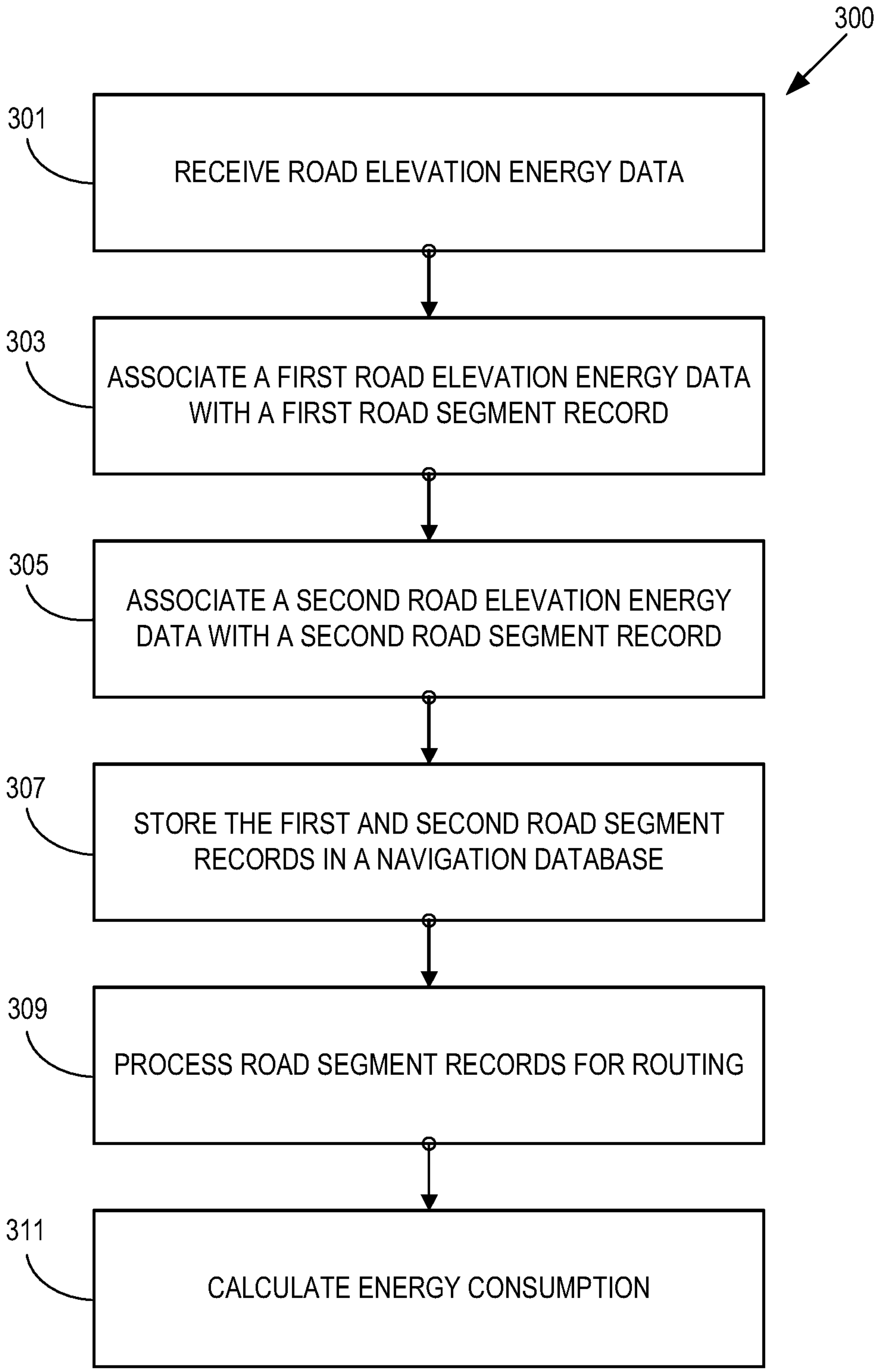
FIG. 3 is a flowchart of a process for developing a system for electric vehicle navigation, according to one embodiment.
Figure 10:
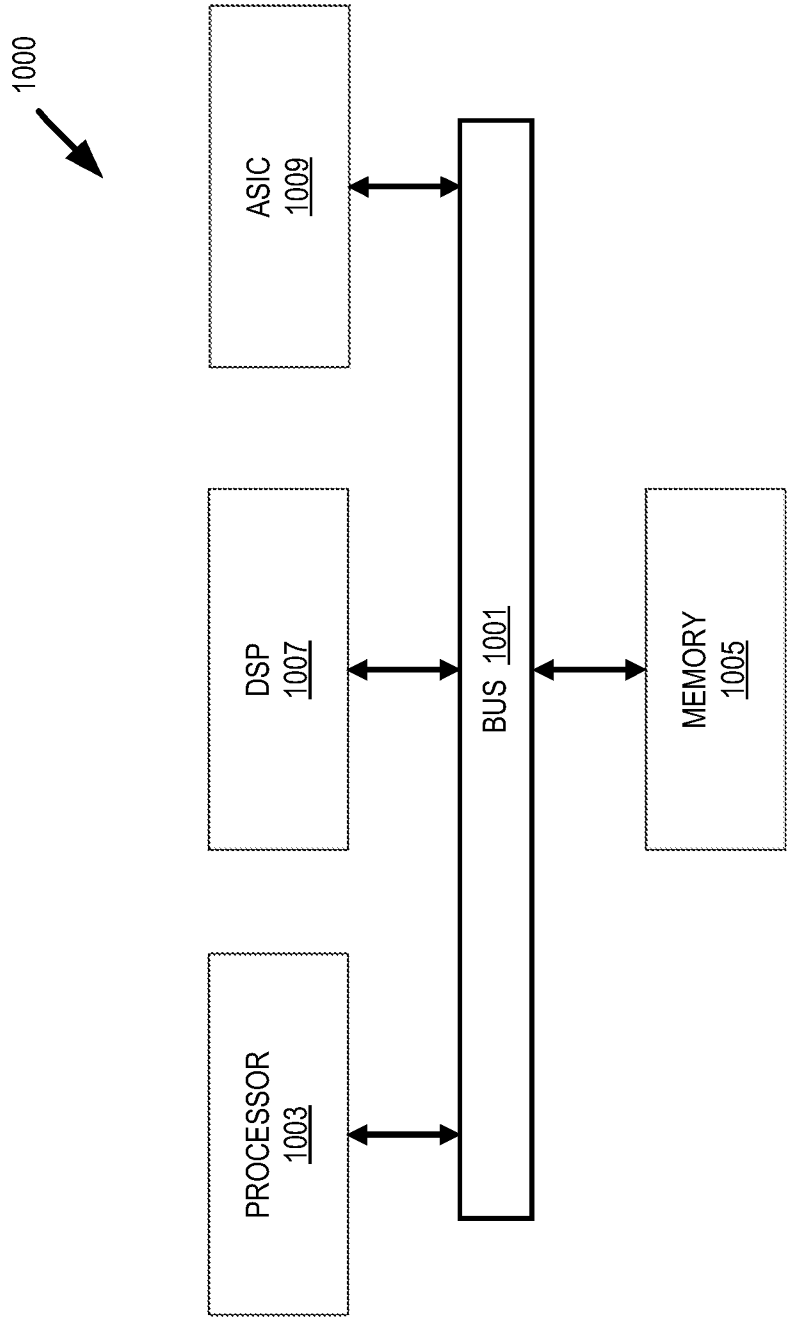
FIG. 10 is a diagram of a chip set that can be used to implement an embodiment of the system of FIG. 1 or one or more components thereof.

FIG. 3 is a flowchart of a process 300 for generating mapping of elevation energy data and using that data for electric vehicle navigation, according to one embodiment. In various embodiments, the map platform 103, the data analysis system 105, any of the modules 201-205, the application 119, the vehicle 109 and/or any machine learning system may perform one or more portions of the process 300 and may be implemented in, for instance, a chip set including a processor and a memory as shown in FIG. 10. As such, the map platform 103, the data analysis system 105, any of the modules 201-205, the application 119, the vehicle 109 and/or any machine learning system can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps. More, fewer, or additional steps may be provided.

In one embodiment, for example in step 301, the processing module 201 can initiate a query or receive road elevation energy data. For example, the road elevation energy data is one or more elevation coefficients of energy. In one embodiment, the elevation coefficient of energy is an elevation coefficient of energy consumption. For instance, when driving uphill the energy consumption increases for the battery of an electric vehicle and so a coefficient of energy consumption based on the specific elevation change or slope or gradient of that particular hill on the road can be captured. In another embodiment, the elevation coefficient of energy is a battery recharge efficiency coefficient. For instance, when driving downhill the energy consumption for the battery decreases up to the level when the battery is partially recharging. Therefore, a battery recharge efficiency coefficient based on the specific elevation change or slope or gradient of that particular hill on the road can be captured. These different coefficients can be collected by vehicles on the road network, such as vehicle 109, or determined by other processes including image processing and the processing module 201 can receive, determine and/or identify them.

In step 303, for example, the processing module 201 associates received or determined road elevation energy data such as an elevation coefficient of energy consumption and/or a battery recharge efficiency coefficient with a road segment record. The association can be that of a map attribute or map layer indexed with the road segment or a portion of the road segment that aligns with the specific elevation change or hill side.

In step 305, for example, the processing module 201 associates another received or determined elevation coefficient of energy consumption and/or battery recharge efficiency coefficient with another road segment record. For example, elevation energy data for another hill or hill side on another road different than the road in step 303 is associated with another road segment record. Accordingly, the different elevation changes along roads in a road network can have respective road elevation energy data associated in the map. As slopes or gradients and elevation changes will be different along different roads or hills, different respective coefficients can be records and associated for future energy consumption processing. In another embodiment, road elevation energy data of one side of a hill can be different than road elevation energy data for the other side of the same hill along the road (e.g., on the same road segment or at a transition point between road segments) and those different coefficients can be associated accordingly.

In one embodiment, for example in step 307, the processing module 201 can store the associations and/or road segment records in a map or navigation database, which will be described in more detail in FIG. 5 below. In one embodiment, the storing can be or include updating the road segment records and/or other records existing in the map database with the associated elevation energy data accordingly.

Figure 4:
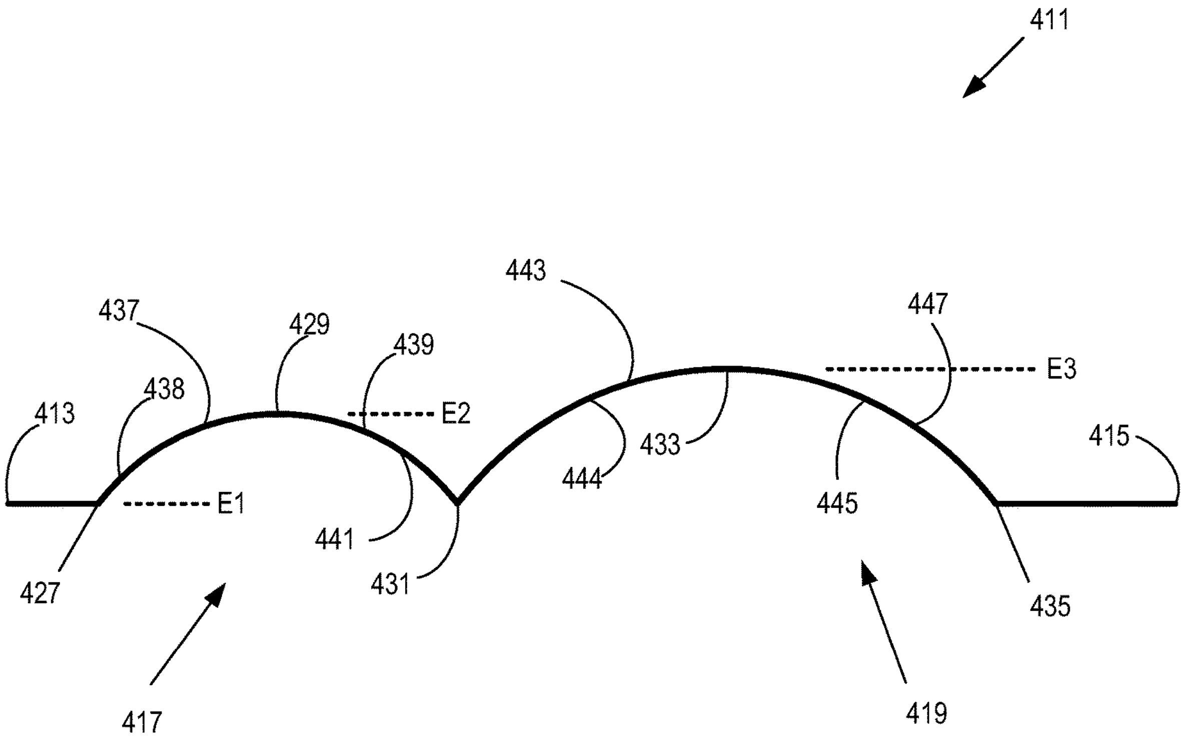
FIG. 4 is a schematic diagram illustrating different features for consideration in the electric vehicle navigation system of FIG. 1, according to one embodiment.

Referring to FIG. 4, a schematic diagram 411 illustrates the different elevation energy data associations as an example. In one embodiment, a road between points 413 and 415 include two hills, hill 417 and hill 419. A hill or other elevation change may include a road incline or decline (like uphill portion or downhill portion). In one embodiment, the elevation change is equal to or greater than a predetermined height threshold, a predetermined length threshold, or a combination thereof. Distance units such as feet, meters, etc. can be utilized. The road can be divided into one or more road segments. For example, a first road segment exists between points 413 and 431 and a second road segment exists between points 431 and 415. In the first road segment, there is an elevation change between points 427 and 429, where the elevation E1 at point 427 is lower than the elevation E2 at point 429. An elevation coefficient of energy consumption 437 is associated with that elevation change. The elevation coefficient of energy consumption, like coefficient 437, is a numerical value like within a range of 0-10, 1-10, 0-100, 1-100 or can be any numerical value. The coefficient 437 is indicative of battery energy consumption when traversing the elevation change from lower to higher, like a road incline. Its value can be power/distance such as watts/meters or watts/feet or any other units. A battery recharge efficiency coefficient 438 is also associated with the same elevation change between points 427 and 429. The coefficient 438 is indicative of battery recharge efficiency when traversing the elevation change from higher to lower, like a road decline. For example, the coefficient 438 can range within 60% and 70%. Other percentages, such as 40%, may be used.

Within the same road segment and on the other side of the hill 417, an elevation coefficient of energy consumption 439 and a battery recharge efficiency coefficient 441 are provided. The coefficients 439 and 441 can be the same values, respectively, as the coefficients 437 and 438 because the road elevation change between points 429 and 431 is the same as the road elevation change between points 427 and 429. However, if the slope or gradient or other factor is different on the two opposite sides of the hill 417, then the coefficient 439 may be a different value than the coefficient 437 and the coefficient 438 maybe different than the coefficient 441 (for example, one can be 62% and the other can be 68%).

In the second road segment between points 431 and 415, there is an elevation change between points 431 and 433, where the elevation E1 at point 431 is lower than the elevation E3 at point 433. An elevation coefficient of energy consumption 443 is associated with that elevation change. The elevation coefficient of energy consumption, like coefficient 443, is a numerical value like within a range of 0-10, 1-10, 0-100, 1-100 or can be any numerical value. The coefficient 443 is indicative of battery energy consumption when traversing the elevation change from lower to higher (incline). Its value can be power/distance such as watts/meters or watts/feet or any other units. A battery recharge efficiency coefficient 444 is also associated with the same elevation change between points 431 and 433. The coefficient 444 is indicative of battery recharge efficiency when traversing the elevation change from higher to lower. For example, the coefficient 444 can range between 60% and 70%. Other percentages, such as 40%, may be used.

Within the second road segment and on the other side of the hill 419, an elevation coefficient of energy consumption 447 and a battery recharge efficiency coefficient 445 are provided. The coefficients 447 and 445 can be the same values, respectively, as the coefficients 443 and 444 because the road elevation change between points 433 and 435 is the same as the road elevation change between points 431 and 433. However, if the slope or gradient or other factor is different on the two opposite sides of the hill 419, then the coefficient 447 may be a different value than the coefficient 443 and the coefficient 445 maybe different than the coefficient 444 (for example, one can be 60% and the other can be 67%). Furthermore, the different respective coefficients, of the respective hills 417 and 419 can be different from each other because of respective differences in geographic features. Accordingly, mapping these different coefficients for the specific elevation changes amongst numerous roads (e.g., latest estimates state that the world has about 40 million miles of roads) allows for processing road segments and calculating energy consumption for a variety of routing options and other navigation features.

Figure 5:
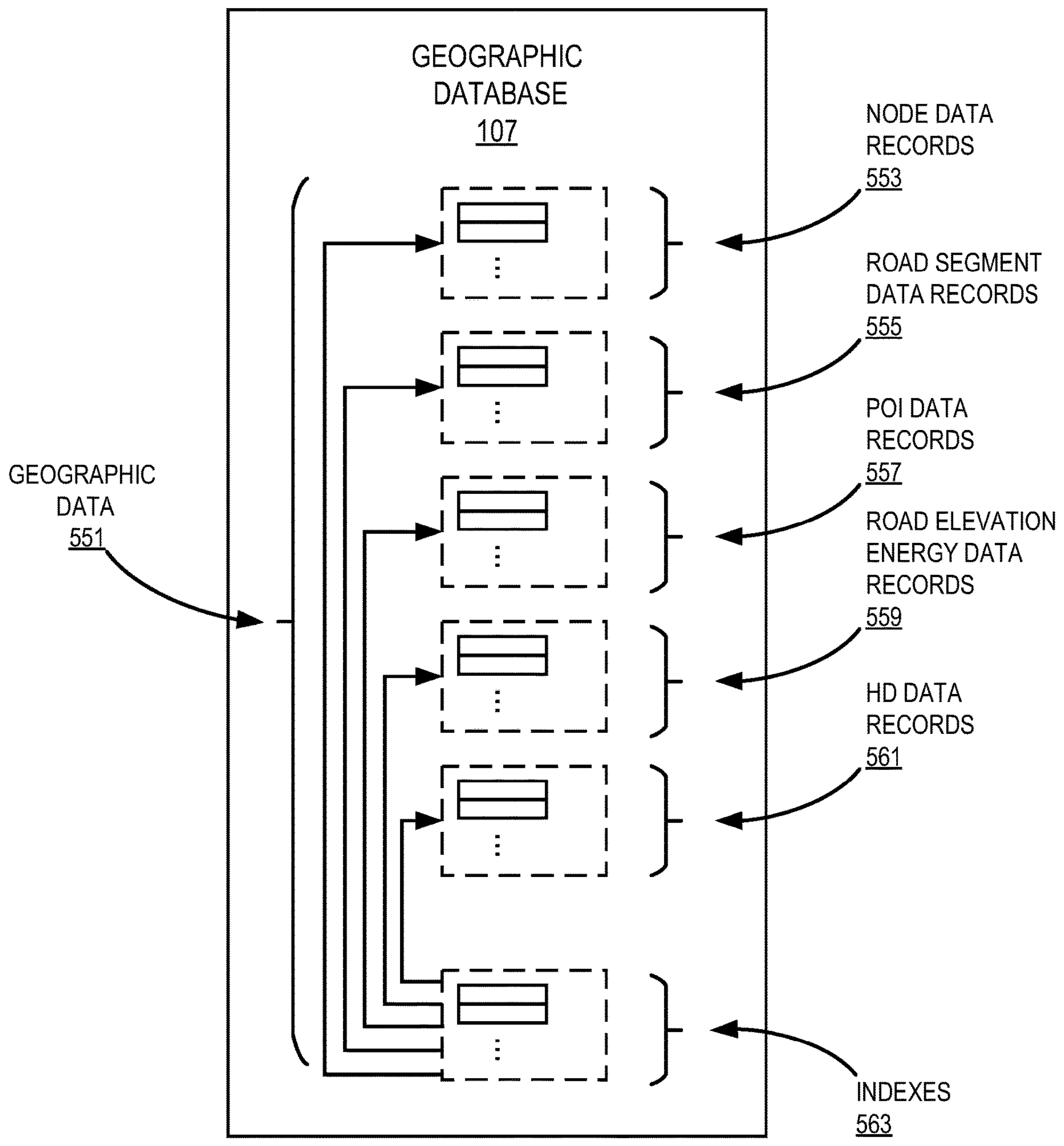
FIG. 5 is a diagram of a geographic database capable of storing map data for providing electric vehicle navigation, according to one embodiment.

FIG. 5 is a diagram of a geographic, map or navigation database 107, according to one embodiment. In one embodiment, the geographic database 107 includes geographic data 551 used for (or configured to be compiled to be used for) mapping and/or navigation-related services, such as for electric vehicle navigation. In one embodiment, the geographic database 107 include high resolution or high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, mapping data capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 107 follows certain conventions. For example, links do not cross themselves and do not cross each other except at a node. Also, there are no duplicated shape points, nodes, or links. Two links that connect each other have a common node. In the geographic database 107, overlapping geographic features are represented by overlapping polygons. When polygons overlap, the boundary of one polygon crosses the boundary of the other polygon. In the geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 107 includes node data records 553, road segment or link data records 555, POI data records 557, road elevation energy data records 559, HD data records 561, and indexes 563, for example. More, fewer or different data records can be provided. In one embodiment, additional data records (not shown) can include cartographic ("carto") data records, routing data, and maneuver data. In one embodiment, the indexes 563 may improve the speed of data retrieval operations in the geographic database 107. In one embodiment, the indexes 563 may be used to quickly locate data without having to search every row in the geographic database 107 every time it is accessed. For example, in one embodiment, the indexes 563 can be a spatial index of the polygon points associated with stored feature polygons.

In exemplary embodiments, the road segment data records 555 are links or segments representing roads, streets, or paths, as can be used in the calculated route or recorded route information for determination of one or more personalized routes. The node data records 553 are end points corresponding to the respective links or segments of the road segment data records 555. The road link data records 555 and the node data records 553 represent a road network, such as used by vehicles, cars, and/or other entities. Alternatively, the geographic database 107 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 557. The geographic database 107 can also include data about places, such as cities, towns, or other communities, and other geographic features, such as bodies of water, mountain ranges, etc. Such place or feature data can be part of the POI data records 557 or can be associated with POIs or POI data records 557 (such as a data point used for displaying or representing a position of a city).

In one embodiment, the geographic database 107 also includes road elevation energy data records 559 for storing static and/or dynamic road elevation energy data, like the coefficients described in FIG. 4, and/or any other data generated or used by the system 100 according to the various embodiments described herein. By way of example, the records 559 can be associated with one or more of the node records 553, road segment records 555, HD data records 561, and/or POI data records 557. In this way, the records 559 can also be associated with or used to classify the characteristics or metadata of the corresponding records 553, 555, 561 and/or 557. In one embodiment, the records 559 can be part of the records 553, 555, 561 and/or 557.

In one embodiment, as discussed above, the HD data records 561 model road surfaces and other map features to centimeter-level or better accuracy. The data records 561 also include lane models that provide the precise lane geometry with lane boundaries, as well as rich attributes of the lane models. Different road elevation coefficients as mentioned in FIG. 4 can be provided at lane level and even the coefficients can be different between different lanes on the same side of a hill on the same road segment depending on the differences in geographic features within the respective lanes. The different lane level elevation energy coefficients can be attributed in the data records 559. These rich attributes include, but are not limited to, lane traversal information, lane types, lane marking types, lane level speed limit information, and/or the like. In one embodiment, the data records 561 are divided into spatial partitions of varying sizes to provide mapping data to vehicles 109 and other end user devices with near real-time speed without overloading the available resources of the vehicles 109 and/or devices (e.g., computational, memory, bandwidth, etc. resources).

In one embodiment, the data records 561 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the data records 561.

In one embodiment, the data records 561 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 107 can be maintained by a map developer that oversees or owns the map platform 103 or can be maintained by the content providers 115 in association with the services platform 113. The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle (e.g., vehicles 109 and/or UE 111) along roads throughout the geographic region to observe features and/or record information about them, for example. Also, remote sensing, such as aerial or satellite photography via satellite 121, can be used.

The geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. Different types of map layers may be utilized. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 109 or a UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Referring back to FIG. 3, for example in step 309, the routing module 203 can process the road segment records associated with road elevation energy data for electric vehicle routing. In one embodiment, the navigation database is configured such that road segments are processed to output a vehicle route to a destination or route information as a function of the respective elevation coefficients. In step 311, for example, energy consumption for a route is calculated.

Figure 6:
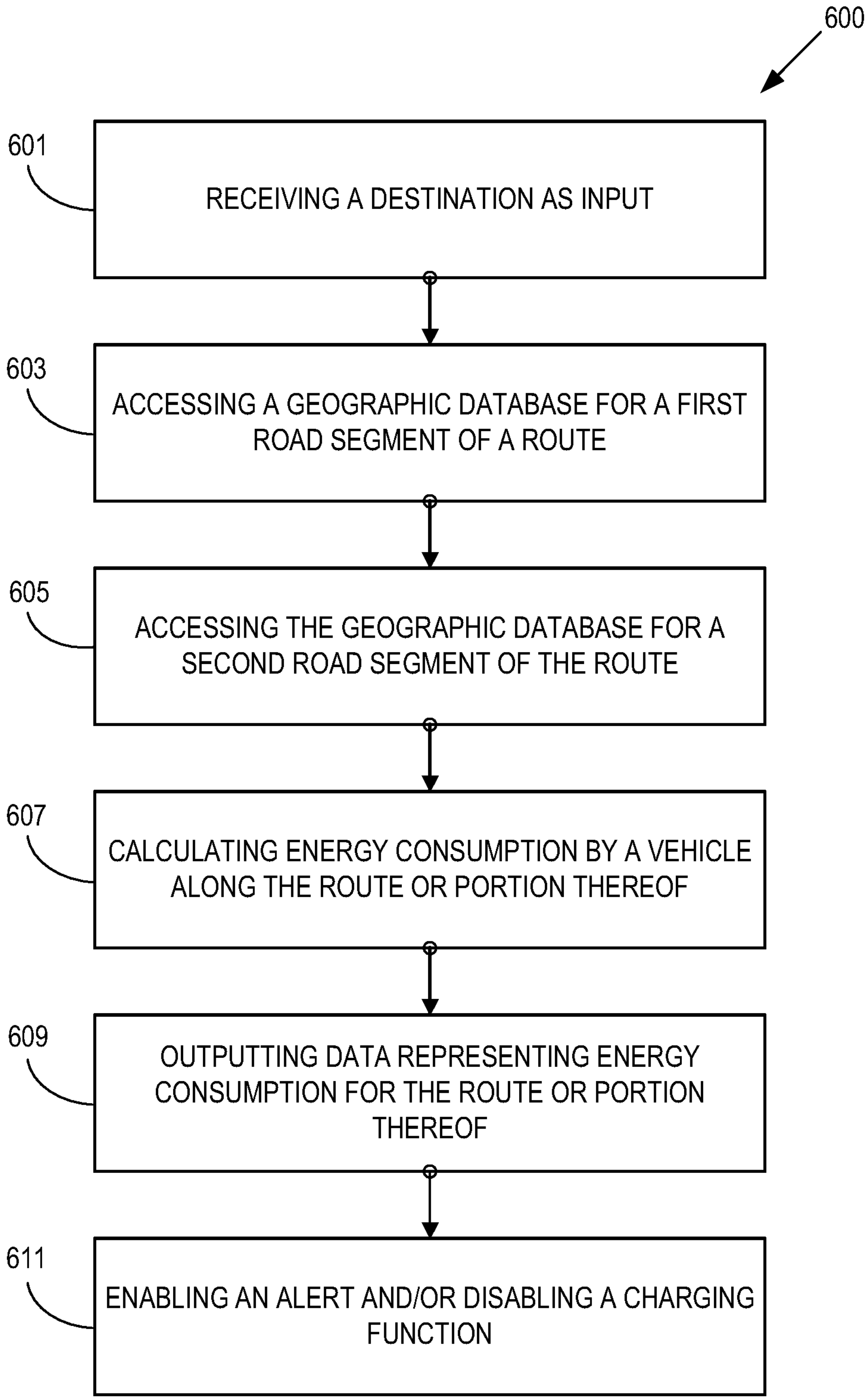
FIG. 6 is a flowchart of a process for providing electric vehicle navigation, according to one embodiment.

FIG. 6 is a flowchart of a process 600 for electric vehicle navigation, according to one embodiment. Although the process 600 is illustrated and described as a sequence of steps, its contemplated that various embodiments of the process 600 may be performed in any order or combination and need not include all of the illustrated steps. More, fewer, or additional steps may be provided.

In one embodiment, for example in step 601, the routing module 203 receives a destination as input. For example, an end user can enter a destination via a user interface, such as a touchscreen. Also, an origin point, which can be selected, or a current location (such as geographic coordinates, like latitude, longitude and/or altitude) is considered by the routing module 203 to be a point from which to travel to the destination.

In step 603, for example, the geographic database 107 is accessed to identify or determine a road segment of a route from the origin to the destination. For example, the route can be a plurality of roads segments that provides a continuous path along a road network to the destination. Road elevation energy data associated with that road segment is considered and identified. For example, the elevation coefficients of energy consumption 437 and 439 and the recharge coefficients 438 and 441 are identified.

In step 605, for example, the geographic database 107 is accessed to identify or determine another road segment of the route from the origin to the destination. The road elevation energy data associated with that road segment is considered and identified. For example, the elevation coefficients of energy consumption 443 and 447 and the recharge coefficients 444 and 445 are identified.

In step 607, based on the different energy coefficients for example, energy consumption for the route or portion thereof is calculated. In one embodiment, the following equation may be used:

$$AEC_{elev} = K_{elev} * (E2 - E1) - K_{elev} * K_{recharge\_eff} * (E2 - E1) + K_{elev} * (E3 - E1) - K_{elev} * K_{recharge\_eff} * (E3 - E1)$$

$AEC_{elev}$ represents additional energy consumption. The electric vehicle 109 will have a regular or baseline energy consumption (which may be obtained by a vehicle OEM or other method) along the route and the additional energy consumption formula will take into account the elevation changes and the energy consumption and recharge associated therewith which can then be added to the baseline energy consumption to have a more accurate overall energy consumption value. $K_{elev}$ represents an elevation coefficient of energy consumption, like coefficients 437 and 443. $K_{recharge\_eff}$ represents a battery recharge efficiency coefficient, like coefficients 438 and 444. When determining the additional energy consumption of a route, determining the different elevation changes in the direction of travel will assist with the specific calculations. For example, if there is an uphill portion, then an elevation coefficient of energy consumption times the elevation change will be calculated. If there is a downhill portion, then a battery recharge efficiency coefficient will be used, for example, like multiplying that efficiency with the downhill elevation coefficient of energy consumption and the elevation change. The downhill portion will be subtracted from the uphill portion for a total additional energy consumption. This procedure will be applied to the different elevation changes along the route for a final additional energy consumption estimation. Accordingly, the equation can be modified based on the different elevation changes and geographic features for any given route or portion thereof.

Referring back to FIG. 4 and the formula above, the additional energy consumption of an electric vehicle, like vehicle 109, traveling from point 413 to point 415 would be the product of the consumption coefficient 438 and the change in elevation between points 427 and 429 minus the product of the consumption coefficient 439, the recharge coefficient 441 and the change in elevation between points 429 and 431 summed with the product of the consumption coefficient 443 and the change in elevation between points 431 and 433 minus the product of the consumption coefficient 447, the recharge coefficient 445 and the change in elevation between points 433 and 435.

In step 609, for example, data representing energy consumption of the vehicle for the route or portion thereof is outputted, such as utilizing the output module 205. As mentioned above, the data representing the energy consumption can be a total energy consumption looking at baseline energy consumption and the additional energy consumption based on the elevation changes and coefficients. In one embodiment, data representing electric vehicle energy levels based on the energy consumption calculations mentioned above or even the calculated energy consumption based on the elevation energy data can be provided via a user interface.

Figure 7:
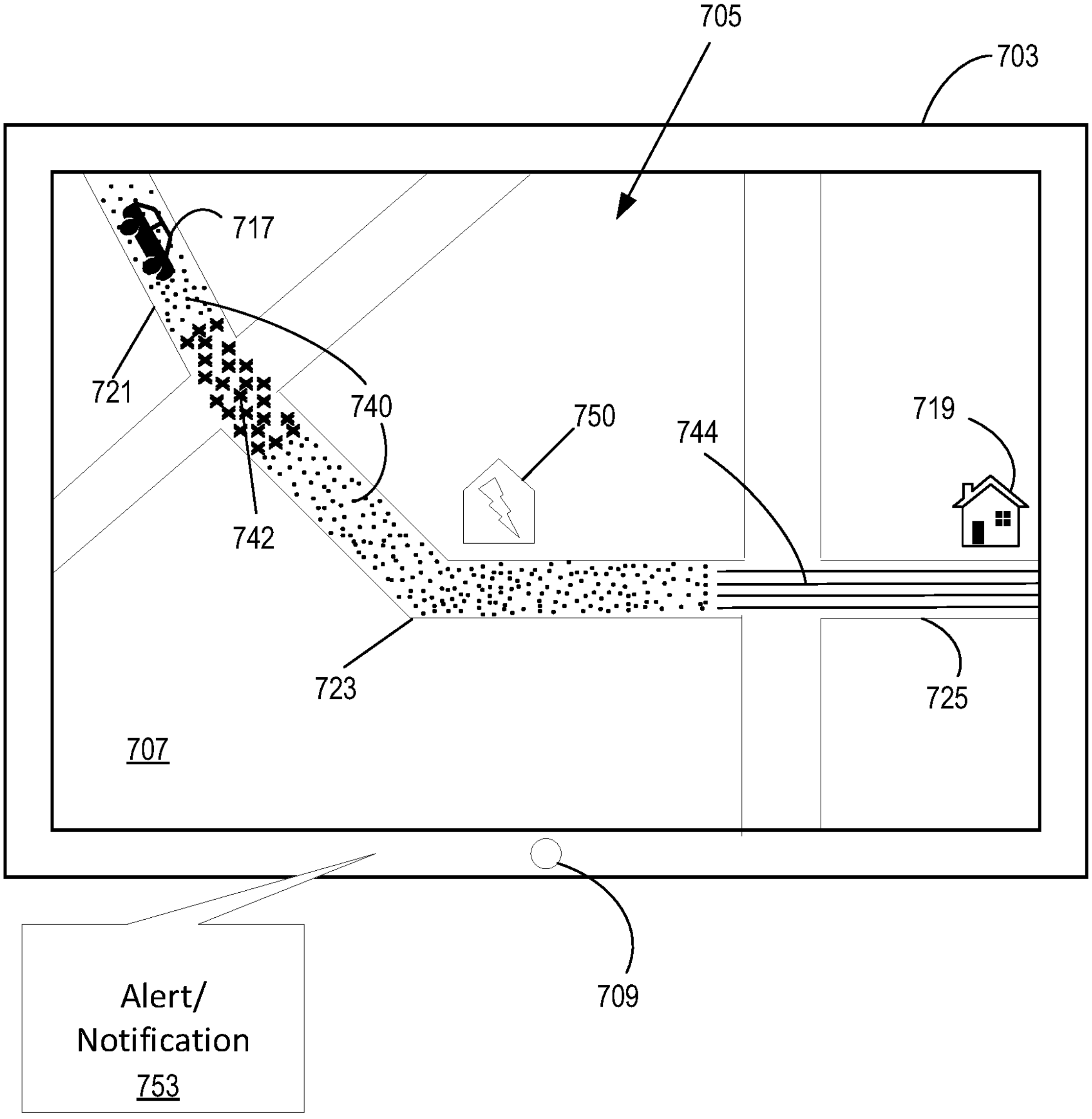
FIG. 7 is an example user interface displaying features of electric vehicle navigation, according to one embodiment.

FIG. 7 illustrates a user interface or device 703, like for example UE 111 or a UI associated with vehicle 109, displaying features of electric vehicle navigation, according to one embodiment. The device or UI 703 includes a display 705 showing a road network or map 707 and a route, a device button 709 such as a power button, and a speaker and/or microphone (not displayed).

A vehicle 717, such as the vehicle 109, is driving from a current location to the destination 719. The route consists of road segments 721, 723, and 725. The route shows dots 740 along portions of segment 721 and 723, cross marks 742 between segments 721 and 725, and parallel lines 744 between segments 723 and 725. The different markings 740, 742, and 744 represent the battery level or energy status of the vehicle 717. The different markings can be represented by respective different colors or shades of colors. A variety of different manners of display (like markings, colors, etc.) may be provided for representing energy consumption and/or battery or energy levels.

In one embodiment, the dots 740 represent a mid-battery level or a mid-energy level, for example, between 20% and 80%. This can be represented with the color yellow. The cross markings 742 represent a high battery level or a high energy level, for example, between 80% and 100%. This can be represented with the color green. For example, the vehicle 717 could initially be at a 79% energy level and while it goes downhill along segment 721 and about to cross into segment 723, the energy level hits 80% because of the recharging. The map 707 shows a transition from 740 to 742. The vehicle 717 may limit the recharging of the battery to a max of 80% when going downhill to not damage the battery (like in step 611). Other limits may be selected. Once the vehicle comes out of the downhill and may even start to climb in elevation on segment 723, the battery level drops below 80% and the route shows the dots 740. Then the battery level can even drop below 20%, which is represented by the parallel lines 744. This can be represented with the color red.

The estimation, prediction, or calculation of energy level along a route can be represented in a variety of ways. Energy rates of consumption or recharging can also be represented. A heat map can be used to show energy level changes along various routes. Exact battery levels along the route can be displayed. Lane level energy levels can be represented (displayed) in both directions along a road. Map tile based energy estimates rather than road level can also be provided, such as in a tile based display.

In step 611 of FIG. 6, for example, an alert may be provided or enabled. In one embodiment, if a battery will be overcharged beyond a predetermined selected recharging limit, such as a threshold (like 80% battery level), an alert 753 can be provided to notify a user and/or an automatic disabling of a vehicle battery charging function can be provided or enabled. Furthermore, the alert 753 can provide a notification to the user about low battery level, like in the area of markers 744, when another predetermined threshold is exceeded or when the battery level falls below the threshold (like 20% battery level). A recommendation to go to a charging station 750 may be provided in such situations, for example, as a waypoint along the route based on initial estimations or predictions as a function of the calculations mentioned herein. The alert 753 may be visual or audio based. In another embodiment, like for an autonomous vehicle, the alert is a data signal or flag notifying a processor the vehicle without any external audio or visual cues.

Figure 8:
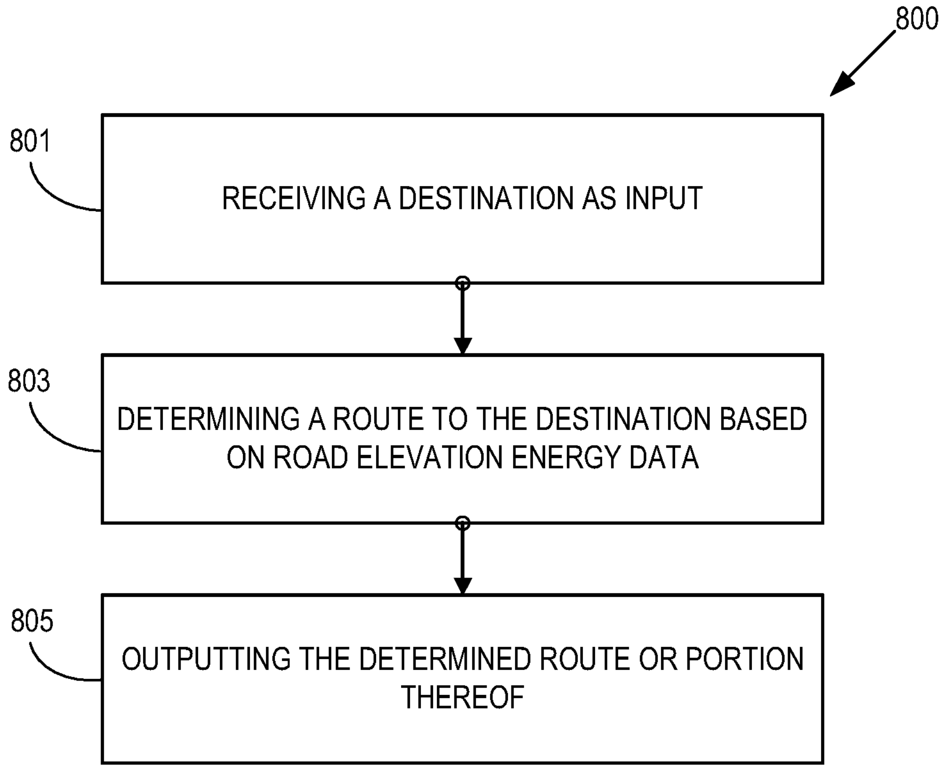
FIG. 8 is a flowchart of a process for providing electric vehicle routing, according to one embodiment.

FIG. 8 is a flowchart of a process 800 for electric vehicle routing, according to one embodiment. Although the process 800 is illustrated and described as a sequence of steps, its contemplated that various embodiments of the process 800 may be performed in any order or combination and need not include all of the illustrated steps. More, fewer, or additional steps may be provided.

In one embodiment, for example in step 801, the routing module 203 receives a destination as input. For example, an end user can enter a destination via a user interface. Also, an origin point, which can be selected, or a current location is considered by the routing module 203 to be a point from which to travel to the destination.

In step 803, a route from an origin, which can be a current location, to the destination is determined via a plurality road segments. The route can be a plurality of road segments forming a continuous path along a road network to the destination. In one embodiment, the routing module 203 selects roads segments based on the energy coefficients associated therewith to maximize energy efficiency. For example, the module 203 can select road segments that have more downhill portions and/or look at recharge coefficients, elevation changes, and/or energy consumption coefficients associated with downhill portions to maximize drivable distance without having to go to a charging station. In one embodiment, downhill recharging is taken as a routing factor when calculating routing options. One route may take 20 minutes longer to get to the destination compared to another route, but that longer route may include more downhill recharging and so a user can select that route to have a higher battery level at the destination comparatively. This may be the case when one is starting at a higher elevation and the destination is at a lower elevation and different routes provide different levels of recharging based on the geographic features and elevation changes along those respective routes (e.g., maybe a shorter route may have more uphill climbs throughout even though the final destination will be at a lower elevation while the longer route is more of a continuous downhill path). In another embodiment, the total elevation change from a starting point (like an origin) to an ending point (like a destination) of two different routes may be the same in which more downhill recharging means more uphill consumption as well. Accordingly, in one example, a shorter route may descend sharply but climb so high going uphill, that the current battery charge is not enough to pass the uphill part; while a longer route may have smaller alternating ascents (energy consumption) and descents (battery recharging) that never hits that point where the battery is fully discharged. Also, a shorter route may descend so low, that the battery is not recharging anymore (e.g., hits a max charge point), thus losing some of the descent section as an opportunity to get additional energy; while a longer route with alternating ascents and descents may never descend as low thus allowing to use all downhill sections to recharge the battery, and as a result the longer route may allow for a higher battery level at the destination comparatively. There could be various situations or scenarios where different combinations of the energy consumption coefficients and the recharge coefficients are more efficient for certain routes, such as longer routes. Longer routes can be longer in terms of distance and/or time, for example.

In step 805 for example, the determined route or portion thereof is outputted as a function of the output module 205. UI features associated with the route mentioned above may also be outputted.

The processes described herein for providing electric vehicle navigation based on elevation energy data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
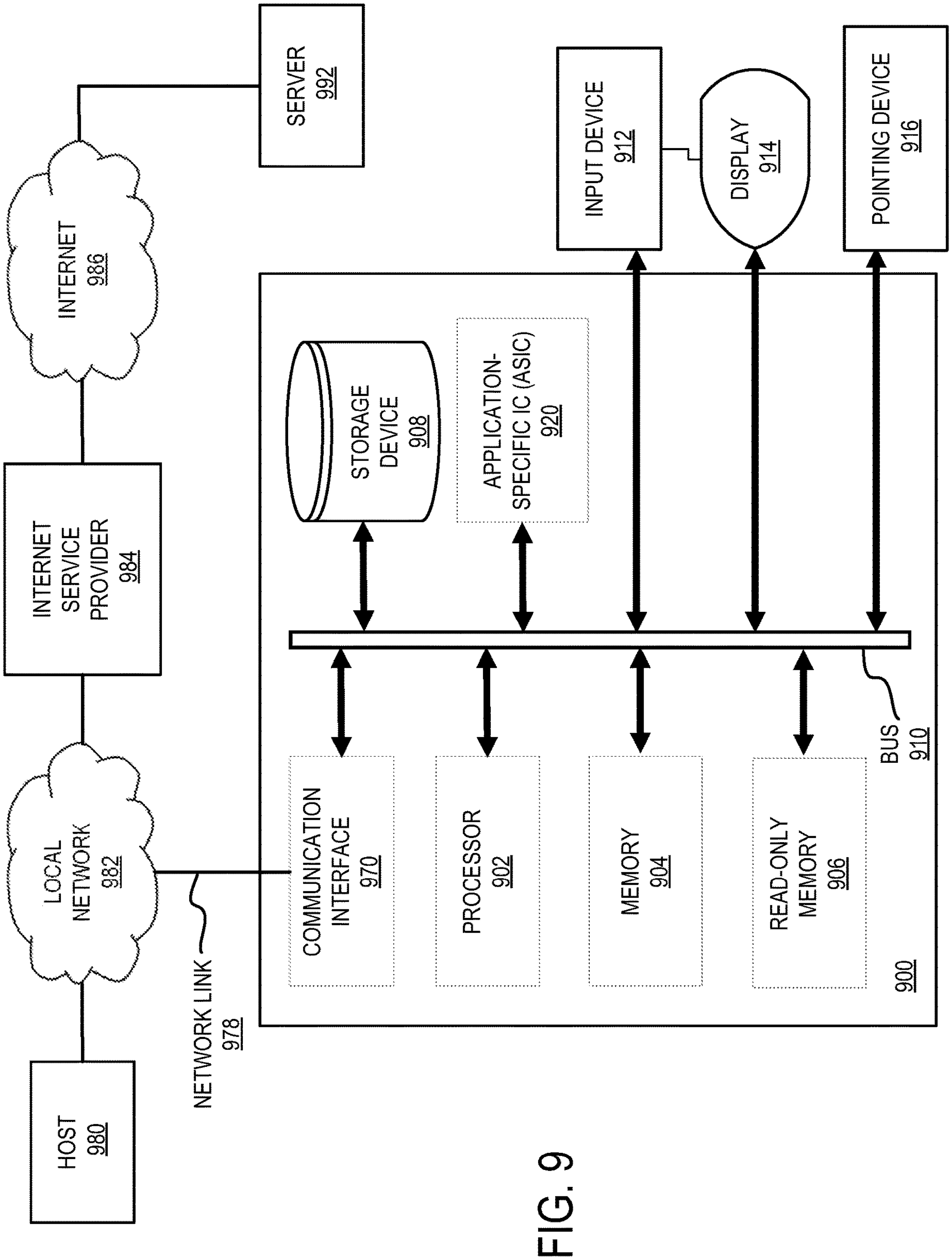
FIG. 9 is a diagram of hardware that can be used to implement an embodiment of the system of FIG. 1 or one or more components thereof.

FIG. 9 illustrates a computer system 900 upon which an embodiment of the invention may be implemented. Computer system 900 is programmed (e.g., via computer program code or instructions) to provide electric vehicle based on road elevation energy data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing electric vehicle navigation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. The processors 902 may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing electric vehicle navigation. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing electric vehicle navigation, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communication interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 982 to which a variety of external devices with their own processors are connected. A host 980, internet service provider 984, internet 986, and server 992 are also provided. For example, communication interface 970 may be a parallel port or a serial port or a universal serial bus (USB) port on a personal computer. In some embodiments, communication interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communication interface 970 enables connection to the communication network 117 for providing electric vehicle navigation based on road elevation energy data.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide electric vehicle navigation as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide electric vehicle navigation. The memory 1005 also stores the data associated with or generated by the execution of the inventive steps.

Figure 11:
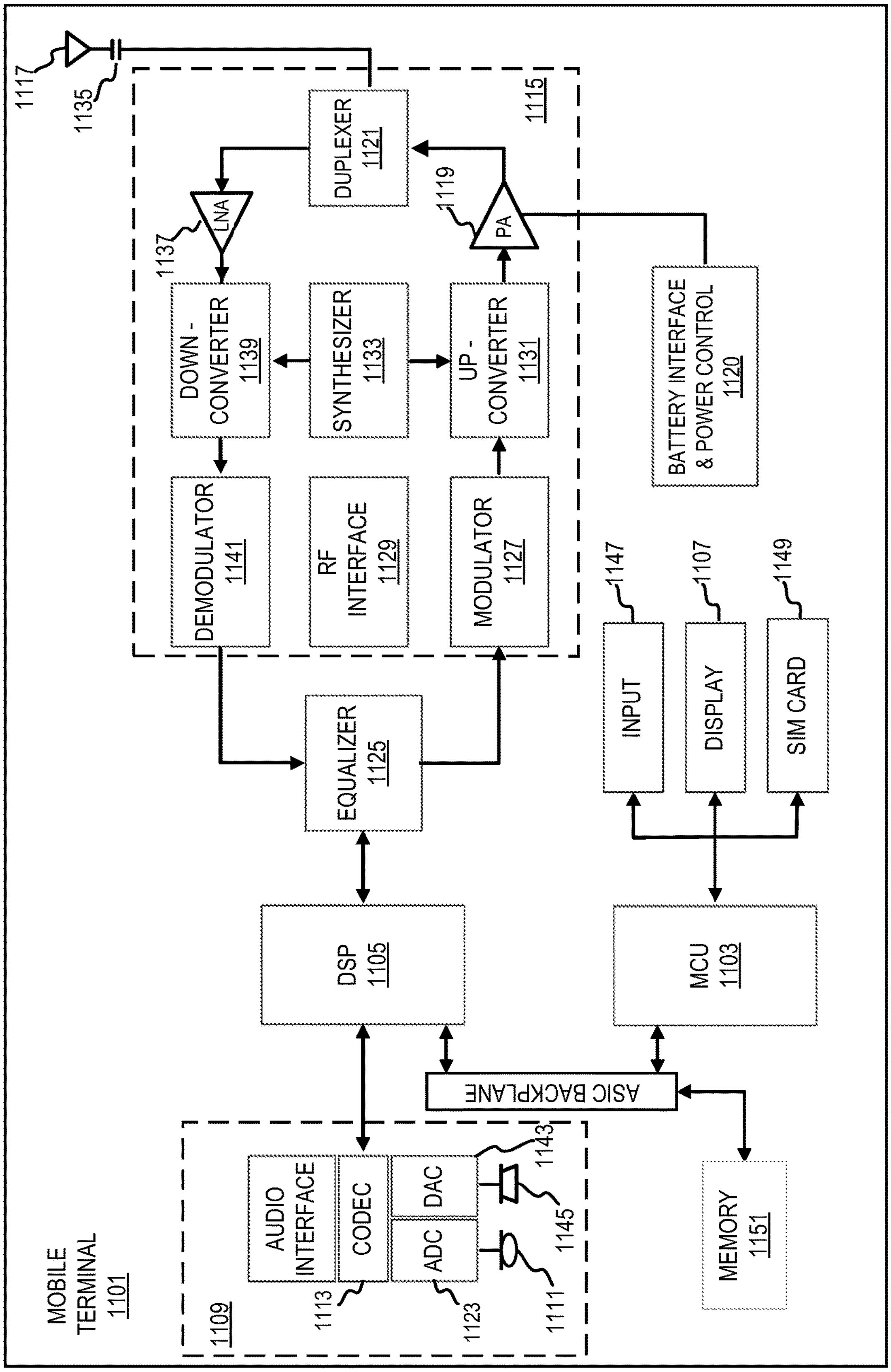
FIG. 11 is a diagram of a mobile terminal (e.g., handset or vehicle or part thereof) that can be used to implement an embodiment of the system of FIG. 1 or one or more components thereof.

FIG. 11 is a diagram of exemplary components of a mobile terminal 1101 (e.g., a mobile device, a vehicle, like vehicle 109, or part thereof, or client device such as the UE 111) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), 5G or 6G, wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the input 1147. The input 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide electric vehicle navigation based on road elevation energy data as described herein. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the mobile station 1101. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

The focus of the description is on additional energy consumption based on elevation and mapping coefficients thereof. However, other factors can be considered along with the elevation data. For example, traffic, speed, weather, road type or material regarding different roads, segments, or portions thereof can be considered for the total energy consumption calculations. Also, the different energy consumption coefficients and/or recharge coefficients can be created and stored based on different conditions along a road segment. A coefficient for road on a hill may change based on the weather condition, type of road material, the speed of the vehicle or traffic, and/or time of day or season. These different coefficients for different conditions on the same road segment can be indexed and utilized for calculation depending on the current or estimated road condition.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for an electric vehicle navigation system, the method comprising:

receiving a destination as input;

accessing a geographic database to obtain data that represents a first road segment of a route to the destination, the data of the first road segment including a first elevation coefficient of energy consumption associated with a first elevation change, wherein the data of the first road segment includes a first battery recharge efficiency coefficient associated with a road decline, the road decline being represented by the first elevation change, and wherein the route includes a plurality of road segments representing a continuous path to the destination on which a vehicle with a battery drive source operates;

accessing the geographic database to obtain data that represents a second road segment of the route, the data of the second road segment including a second elevation coefficient of energy consumption associated with a second elevation change, wherein the first elevation coefficient is different than the second elevation coefficient;

calculating energy consumption by the vehicle along the route or portion thereof based on, at least in part, a product of the first battery recharge efficiency coefficient, the first elevation coefficient of energy consumption and the first elevation change summed with a product of the second elevation coefficient of energy consumption and the second elevation change; and outputting data representing energy consumption for the route or portion thereof as a function of the calculated energy consumption.

2. The method of claim 1, wherein the second elevation change comprises a different road incline or decline.

3. The method of claim 1, wherein the first or second elevation change associated with the first or second road segment is equal to or greater than a predetermined height threshold, a predetermined length threshold, or a combination thereof.

4. The method of claim 1, wherein the data of the first road segment includes a third elevation coefficient of energy consumption associated with a third elevation change, the first elevation change and the third elevation change being associated with a hill, and wherein the first elevation change represents one side of the hill and the third elevation change represents another side of the hill.

5. The method of claim 4, wherein the third elevation coefficient of energy consumption is different than the first elevation coefficient of energy consumption.

6. The method of claim 1, wherein the data of the second road segment includes a second battery recharge efficiency coefficient associated with a road decline, the road decline being represented by the second elevation change, and wherein the first battery recharge efficiency coefficient is different than the second battery recharge efficiency coefficient.

7. The method of claim 1, wherein the calculated energy consumption by the vehicle along the route or portion thereof comprises an additional energy consumption caused by the elevation changes.

8. The method of claim 7, wherein the outputted data representing energy consumption for the route or portion thereof includes a baseline calculated energy consumption of the vehicle and the additional energy consumption.

9. The method of claim 1, further comprising:

enabling an alert when a calculated battery charge level drops below a first threshold at any point along the route, the calculated battery charge level determined based on the calculated energy consumption; or enabling an alert or disabling battery charging when the calculated battery charge level exceeds a second threshold at any point along the route.

10. The method of claim 9, wherein the first threshold is set at 20% and the second threshold is set at 80%.

11. An apparatus comprising:

at least one processor; and at least one memory including computer program code for one or more programs, the at least one memory and the computer program code configured to, with the at least one processor, cause the apparatus to perform at least the following, receive respective elevation coefficients of energy;

associate a first elevation coefficient of the respective elevation coefficients with a first road segment record;

associate a second elevation coefficient of the respective elevation coefficients with a second road segment record, the first elevation coefficient being different than a second elevation coefficient;

store the first road segment record and the second road segment record in a navigation database, wherein the first elevation coefficient is associated with a first elevation change and the second elevation coefficient is associated with a second elevation change, wherein the value of the first elevation coefficient associated with the first elevation change is different for differing weather conditions and the value of the second elevation coefficient associated with the second elevation change is different for the differing weather conditions; and wherein the navigation database is configured such that the first and second road segments are processed to output a vehicle route to a destination or route information thereof as a function of the first and second elevation coefficients.

12. The apparatus of claim 11, wherein the navigation database is further configured to calculate energy consumption by a vehicle along the route or portion thereof based on the first elevation change associated with the first road segment and the first elevation coefficient and further based on the second elevation change associated with the second road segment and the second elevation coefficient.

13. A non-transitory computer-readable storage medium carrying one or more sequences of one or more instructions which, when executed by one or more processors, cause an apparatus to perform:

receiving a destination as input;

determining a route from an origin to the destination via a plurality of road segments, the determining including selecting a first road segment to be part of the route based on a first elevation coefficient of energy associated with a first elevation change, the first elevation coefficient of energy attributed to the first road segment in a map database, wherein the value of the first elevation coefficient of energy associated with the first elevation change is different for differing weather conditions; and outputting the determined route or a portion thereof.

14. The non-transitory computer-readable storage medium of claim 13, wherein the determining further includes selecting a second road segment to be part of the route based on a second elevation coefficient of energy associated with a second elevation change, the second elevation coefficient of energy attributed to the second road segment in the map database, and wherein the first elevation coefficient is different than the second elevation coefficient.

15. The non-transitory computer-readable storage medium of claim 14, wherein the outputting of the determined route or a portion thereof includes displaying a representation of a map including the route or portion thereof, wherein a first portion of the route is displayed in a first manner based on a calculated energy consumption associated with the first portion, and wherein a second portion of the route is displayed in a second manner based on a calculated energy consumption associated with the second portion, the first manner being different than the second manner, and wherein the calculated energy consumption associated with the first portion is based on the first elevation coefficient and the calculated energy consumption associated with the second portion is based on the second elevation coefficient.

16. The non-transitory computer-readable storage medium of claim 15, wherein the first manner comprises a first color and the second manner comprises a second color.

17. The non-transitory computer-readable storage medium of claim 13, wherein the first elevation coefficient of energy comprises a battery recharge coefficient.

* * * * *